Oct. 11, 1927.
A. H. WILKE
EGG METER
Filed Jan. 3, 1927
1,645,468
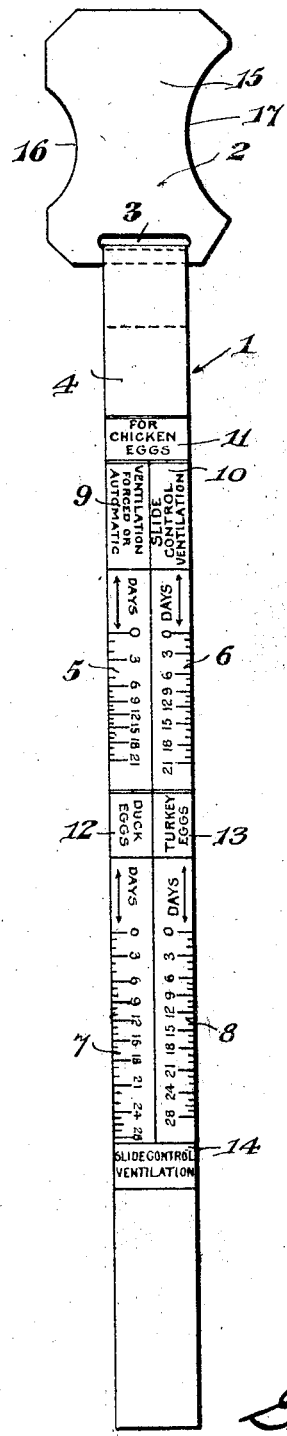
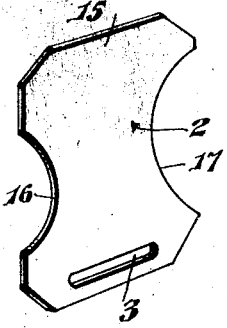
INVENTOR.
Alfred H. Wilke,
BY
Geo. P. Kimmel ATTORNEY.

Patented Oct. 11, 1927.

1,645,468

UNITED STATES PATENT OFFICE.

ALFRED H. WILKE, OF BOISE, IDAHO.

EGG METER.

Application filed January 3, 1927. Serial No. 158,647.

This invention relates to an egg meter for use during incubation of chicken, duck, turkey or other eggs and has for its object to provide, in a manner as hereinafter set forth, a meter of such class for ascertaining the size of the air cells in the eggs during different periods of incubation, and further for determining what eggs should be removed or rather transferred from one incubator to another containing less moisture.

Further objects of the invention are to provide, in a manner as hereinafter set forth, an egg meter which is simple in its construction and arrangement, strong, durable, compact, thoroughly efficient and convenient in its use, and inexpensive to manufacture.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claim hereunto appended.

In the drawings wherein like reference characters denote corresponding parts throughout the several views:

Figure 1 is a front elevation of an egg meter in accordance with this invention.

Figure 2 is a longitudinal sectional view thereof.

Figure 3 is a perspective view of the meter.

The drawing illustrates, an egg meter for use in connection with chicken, duck and turkey eggs, but it is to be understood that the principle of the meter can be employed in connection with any class of eggs. The meter includes an indicator member referred to generally by the reference character 1 and a gauge member referred to generally by the reference character 2. The indicator member 1 is formed from a narrow strip of flexible material and is connected at one end to one end of the gauge member, and for this purpose the latter is formed with a transverse slot 3 in proximity to one end thereof, and the member 1 is extended through the slot 3 and overlaps the member 2 at the slotted end thereof, and the portions of the member 1 which overlap the member 2 are suitably secured together as at 4. The gauge member 2 is formed of rigid material, preferably metal.

The indicator member 1 comprises a body portion 4 of appropriate width and length and having one face thereof provided with sets of indicating indicia designated 5, 6, 7 and 8. Each set of indications indicate the size of the air cells in the egg during different periods of incubation. The set of indications 5 is used when ventilation is forced or automatic and in connection with chicken eggs, and the set of indications 6 is employed when slide control ventilation is used and in connection with chicken eggs. Conventional means, as at 9, is arranged on the body portion 4 to designate the purpose of the indications 5 and conventional means 10 is arranged on the body portion 4 and is associated with the indications 6 to designate with what class of ventilation the indications 6 are employed. Conventional means 11 is arranged on the body portion 4 for designating that the indications 5, 6 and designated means 9 and 10 are used in connection with chicken eggs.

Conventional means, as at 12 is arranged on the body portion 4 to designate on what type of egg the indications 7 are employed, and conventional means as at 13 is positioned on the body portion 4 to designate on what type of egg the indications 8 are employed. The body portion 4 is furthermore provided with conventional means, as at 14 to designate the character of ventilation with which the indications 7, 8 are employed.

The gauge member 2 has the body portion thereof indicated at 15 and is formed with a pair of gauging parts 16, 17 formed in the side edges thereof. The gauging parts 16 and 17 are provided by setting up the side edges with concaved portions. The concaved portion which forms the gauging part 6 is of less width and depth than the width and depth of the gauging portion 17. The gauging portion 16 is provided for chicken eggs and the gauging portion 17 for turkey or duck eggs. The gauging portions 16 and 17 are employed to gauge the size of the air cell for a determined period of incubation. The gauging portion 16 is employed for gauging the size of the air cell of a chicken egg on the fifteenth day of incubation and gauging portion 17 is employed for gauging the size of the air cell of a turkey or duck egg on the twentieth day of incubation.

The eggs are held up to the light, such as an electric or oil lamp or candle for marking the size of the air cells during different periods of incubation and the indicator member 1 is then laid on the egg and over the air cell to determine if the air cell is of correct size for a determined period.

The gauge member 2 is employed for candling out eggs on the fifteenth day of incubation, that is to say in connection with chicken eggs, and all the eggs with smaller air cells than the gauging portion 16 should be separated and placed in another incubator with less moisture. The turkey or duck eggs are candled out and separated on the twentieth day of incubation and the cells are gauged by the portion 17.

It is thought the many advantages of an egg meter, in accordance with this invention, can be readily understood, and although the preferred embodiment of the invention is as illustrated and described, yet it is to be understood that changes in the details of construction can be had which will fall within the scope of the invention as claimed.

What I claim is:

In an egg meter a gauge element comprising a body portion having one of its edges for a part of its length inset to provide a gauging portion to gauge the size of an egg air cell for a determined period of incubation.

In testimony whereof, I affix my signature hereto.

ALFRED H. WILKE.